(12) United States Patent
Yoon et al.

(10) Patent No.: US 7,273,679 B2
(45) Date of Patent: Sep. 25, 2007

(54) SECONDARY BATTERY

(75) Inventors: Hye-Won Yoon, Suwon-si (KR);
Sang-Eun Cheon, Suwon-si (KR);
Jae-Kyung Kim, Suwon-si (KR);
Seok-Yoon Yoo, Suwon-si (KR)

(73) Assignee: Samsung SDI Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 11/249,489

(22) Filed: Oct. 14, 2005

(65) Prior Publication Data

US 2006/0093910 A1 May 4, 2006

(30) Foreign Application Priority Data

Oct. 28, 2004 (KR) .................... 10-2004-0086598

(51) Int. Cl.
*H01M 4/02* (2006.01)
*H01M 2/24* (2006.01)
*H01M 2/26* (2006.01)
*H01M 2/02* (2006.01)

(52) U.S. Cl. .................... 429/211; 429/160; 429/161; 429/178

(58) Field of Classification Search ............... 429/211, 429/129, 160, 161, 233, 152, 178; 24/623.1
See application file for complete search history.

(56) References Cited

U.S. PATENT DOCUMENTS

| 5,585,206 A | * | 12/1996 | Morris | ................. 429/161 |
| 6,190,794 B1 | * | 2/2001 | Wyser | ................. 429/94 |
| 2002/0028377 A1 | * | 3/2002 | Gross | ................. 429/129 |

* cited by examiner

*Primary Examiner*—Patrick Joseph Ryan
*Assistant Examiner*—Thomas H. Parsons
(74) *Attorney, Agent, or Firm*—Robert E. Bushnell, Esq.

(57) ABSTRACT

A secondary battery includes an electrode assembly having a positive electrode, a negative electrode and a separator, and a case containing the electrode assembly therein. A cap assembly is attached to the case and has a positive electrode terminal and a negative electrode terminal. The positive and the negative electrodes have non-active material portions with no active material, and the positive and the negative electrode terminals are respectively electrically connected to the non-active material portions of the positive and the negative electrodes. A width of the electrode assembly $W_1$ is greater than a width of the positive and negative electrode non-active material portions $W_2$.

12 Claims, 5 Drawing Sheets

SECONDARY BATTERY

CLAIM OF PRIORITY

This application makes reference to, incorporates the same herein, and claims all benefits accruing under 35 U.S.C. §119 from an application for SECONDARY BATTERY earlier filed in the Korean Intellectual Property Office on 28 Oct. 2004 and there duly assigned Serial No. 10-2004-0086598.

BACKGROUND OF THE INVENTION

1. Field of the Invention

The present invention relates to a secondary battery, and in particular, to a secondary battery which improves the structure of non-active material portions of the electrode assembly to enhance the current collecting efficiency.

2. Description of the Related Art

Secondary batteries are classified into low-capacity secondary batteries (referred to hereinafter as "low-capacity batteries"), which use one or more battery cells packaged in the form of a pack, and motor driving high-capacity secondary batteries (referred to hereinafter as "high-capacity batteries"), which use tens of battery cells packaged into a battery pack.

The low-capacity batteries are used as the power supply for small electronic devices, such as cellular telephones, notebook computers, and camcorders, while the high-capacity batteries are used as the power supply for driving motors in hybrid electric vehicles and the like.

When the low-capacity battery is constructed with a cell, it is mainly formed with a cylindrical shape or a prismatic shape. An insulating separator is disposed between band-typed positive and negative electrodes, which are wound in a spiral shape to form an electrode assembly. The electrode assembly is inserted into a case to construct a battery.

Conductive tabs are attached to the positive and the negative electrodes as lead terminals for collecting the electric current respectively generated by the positive and the negative electrodes. The conductive tabs are welded to the positive and the negative electrodes, and transfer the electric current generated by the positive and the negative electrodes to positive and the negative electrode terminals.

When the above-described low-capacity battery structure is directly applied for use in a high-capacity battery, it cannot satisfy the operational characteristics of the latter with respect to capacity or power. Therefore, it has been proposed that a multi-tap structure should be introduced to increase the battery capacity or power.

The multi tap structure is structured such that a plurality of taps are connected to the positive and the negative electrodes of the electrode assembly, and merged into positive and negative electrode taps, which are then connected to the positive and the negative electrode terminals.

Moreover, a current collecting plate structure can replace the tap structure to collect the electric current from the electrode assembly in the high-capacity battery.

The current collecting plate structure transfers the electric current from the electrode assembly to the positive and the negative electrode terminals by connecting the current collecting plate to the positive and the negative electrodes of the electrode assembly. Such a structure has an advantage in that it enlarges the contact area between the current collecting plate functioning as a lead element and the positive and negative electrodes of the electrode assembly, as compared to the tap structure.

For this reason, with the secondary batteries forming a motor driving secondary battery module, the current collecting uses the current collecting plate.

When the motor driving secondary battery is formed with a prismatic shape rather than with a cylindrical shape, positive and negative electrode terminals are provided on a cap plate fitted to the case. The electrode terminals are electrically connected to the positive and the negative electrodes of the electrode assembly contained within the case to collect the electric current generated by the positive and the negative electrodes.

The structure of the electrical connections between the electrode terminals and the electrode assembly directly influences the current collecting efficiency of the prismatic-shaped battery. Accordingly, it is necessary to make the electrical connection in a reasonable manner.

However, when the lead elements are tightly adhered to the contact area of the electrode assembly contacting the electrode terminals to electrically interconnect the electrode terminals and the electrode assembly, a gap occurs at that contact area, making it difficult to achieve excellent connections.

This phenomenon occurs due to the shape of the non-active material portions of the positive and negative electrodes of the electrode assembly, to which the lead elements are tightly adhered.

SUMMARY OF THE INVENTION

It is an object of the present invention to provide a secondary battery which has lead elements well contacting the electrodes of an electrode assembly to connect electrode terminals to those electrodes.

This and other objects may be achieved by a secondary battery with the following features.

According to one aspect of the present invention, the secondary battery includes: an electrode assembly including a positive electrode, a negative electrode, and a separator, the positive and the negative electrodes having non-active material portions containing no active material; a case adapted to contain the electrode assembly therein; and a cap assembly attached to the case and including a positive electrode terminal and a negative electrode terminal, the positive and the negative electrode terminals being respectively electrically connected to the non-active material portions of the positive and the negative electrodes; a width of the electrode assembly $W_1$ is greater than a width of the positive and the negative electrode non-active material portions $W_2$.

The positive and the negative electrode non-active material portions preferably include at least one cut portion. The positive and the negative electrode non-active material portions preferably include a hexahedron shape. The positive and the negative non-active material portions preferably respectively include laminated separate and flat positive and negative current collectors.

The positive and the negative electrode terminals are preferably respectively electrically connected to the positive and the negative electrode non-active material portions via lead elements.

The cap assembly preferably includes a cap plate having coupling holes adapted to receive the positive and negative electrode terminals, and the cap plate is preferably coupled to the case and adapted to cover an opening of the case.

The secondary battery preferably has a prismatic shape. The secondary battery is preferably a motor driving battery.

According to another aspect of the present invention, the secondary battery includes: an electrode assembly including a positive electrode, a negative electrode, and a separator, the positive and the negative electrodes having non-active material portions containing no active material; a case adapted to contain the electrode assembly therein; and a cap assembly attached to the case and including a positive electrode terminal and a negative electrode terminal, the positive and the negative electrode terminals being respectively electrically connected to the non-active material portions of the positive and the negative electrodes; a thickness of the electrode assembly $D_1$ is greater than a thickness of the positive and the negative electrode non-active material portions $D_2$.

The positive and the negative electrode non-active material portions preferably include at least one cut portion.

The positive and the negative electrode terminals are preferably respectively electrically connected to the positive and the negative electrode non-active material portions via lead elements, and the cut portions are preferably arranged at contact areas of the positive and the negative electrode non-active material portions contacting the lead elements.

The cap assembly preferably includes a cap plate having coupling holes adapted to receive the positive and negative electrode terminals, and the cap plate is preferably coupled to the case and adapted to cover an opening of the case.

The secondary battery preferably has a prismatic shape. The secondary battery is preferably a motor driving battery.

BRIEF DESCRIPTION OF THE DRAWINGS

A more complete appreciation of the present invention and many of the attendant advantages thereof, will be readily apparent as the present invention becomes better understood by reference to the following detailed description when considered in conjunction with the accompanying drawings in which like reference symbols indicate the same or similar components, wherein.

DETAILED DESCRIPTION OF THE INVENTION

The present invention will be described more fully hereinafter with reference to the accompanying drawings, in which preferred embodiments of the invention are shown.

Figure 1:
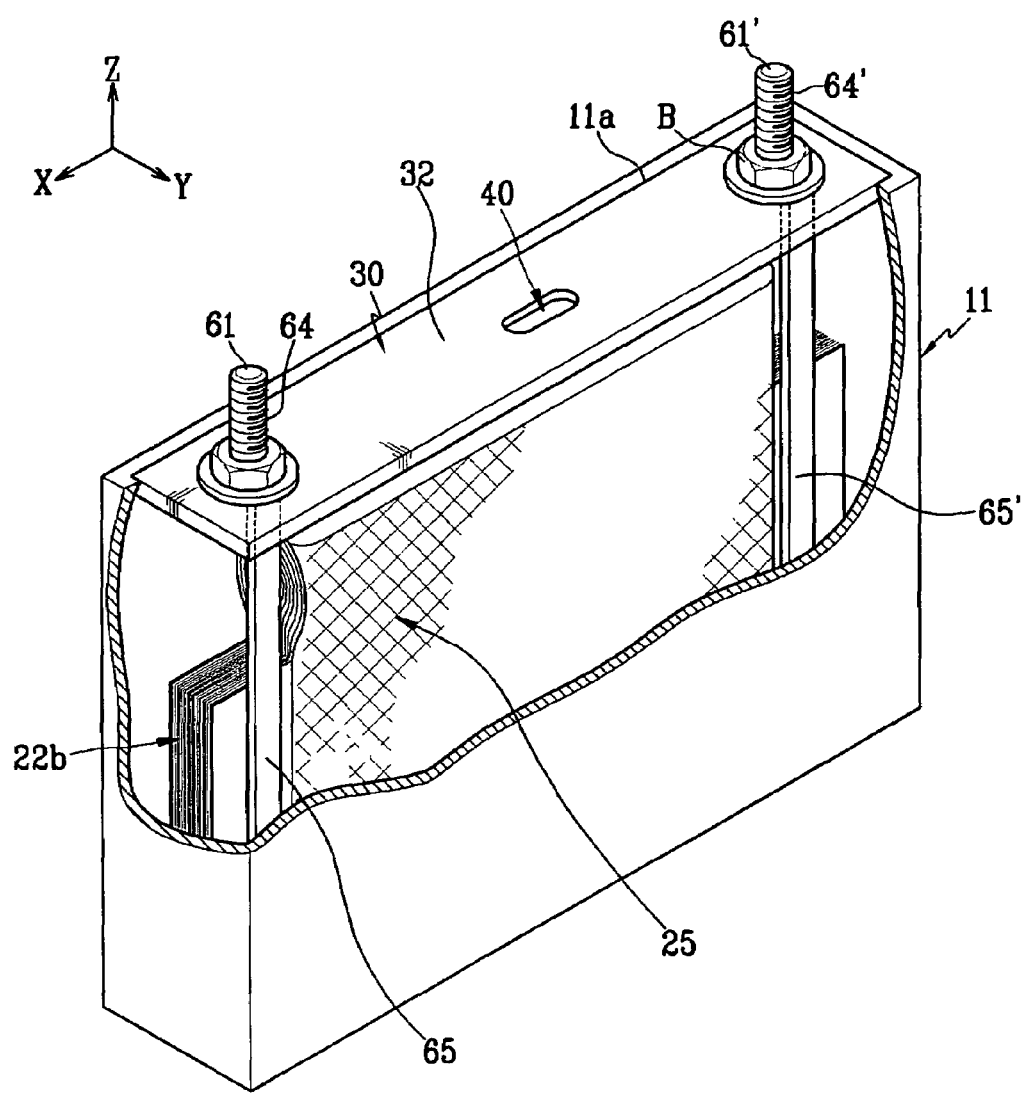
FIG. 1 is a partial sectional perspective view of a secondary battery according to a first embodiment of the present invention.

FIG. 1 is a partial sectional perspective view of a prismatic-shaped secondary battery according to an embodiment of the present invention.

Referring to FIG. 1, the secondary battery includes a case 11 having a longitudinally extended prismatic shape (in the direction of the X axis of the drawing) and an opening 11a, an electrode assembly 25 contained within the case 11, and a cap assembly 30 sealing the opening 11a of the case 11. The electrode assembly 25 is formed by winding positive and negative electrodes while interposing a separator.

The case 11 is formed of a conductive metallic material, such as aluminum, an aluminum alloy, or nickel-plated steel. The case 11 has a hexahedral-shaped structure and the opening 11a is formed to receive the prismatic-shaped electrode assembly 25 and contain it therein.

The cap assembly 30 has a cap plate 32 well adapted in shape to the opening 11a of the case 11. Positive and negative electrode terminals 61 and 61' are provided at the cap plate 32.

In this embodiment, the positive and the negative electrode terminals 61 and 61' have screw threads S at the outer circumferences thereof, and are integrated with lead elements 65 and 65' electrically connected to the non-active material portions of the positive and the negative electrodes.

As shown in the drawing, the positive and the negative electrode terminals 61 and 61' are fixed on the cap plate 32 to protrude outwards. The two electrode terminals 61 and 61' are lengthened such that when a plurality of cells are combined to form a secondary battery module, a connector (not shown) can be attached thereto to interconnect the neighboring cells.

In this embodiment, the positive and negative electrode terminals 61 and 61' and the lead elements 65 and 65' are integrated with each other in a body. The lead elements 65 and 65' are formed with a linear conductor.

While the positive and negative electrode terminals 61 and 61' and the lead elements 65 and 65' are integrated into one body in this exemplary embodiment of the present invention, the combination or specific structure of the positive and negative electrode terminals 61 and 61' and the lead elements 65 and 65' are not limited thereto.

Moreover, the cap assembly 30 includes a vent 40 for ventilating the gas generated from the interior of the case 11 to prevent a battery explosion. The vent 40 is placed at a predetermined location of the cap plate 32.

The electrode assembly 25 according to the embodiment of the present invention will be now explained with reference to FIGS. 2A to 2C.

As shown in the drawings, the electrode assembly 25 is structured such that a separator 21 is disposed between the positive and the negative electrodes 22 and 23, and wound around the winding axis O in the form of a jelly roll, followed by being pressed by a press into a prismatic shape.

The positive and the negative electrodes 22 and 23 and the separator 21 are band-shaped, and when wound, the non-active material portions 22b and 23b of the positive and the negative electrodes 22 and 23 protrude from both ends of the electrode assembly 25 while facing each other.

The positive and the negative electrode non-active material portions 22b and 23b are regions where the active material is not coated on the respective current collectors substantially forming the positive and the negative electrodes 22 and 23.

The positive and the negative electrode non-active material portions 22b and 23b are multiply-laminated in accordance with the jelly roll-shaped structure of the electrode assembly which are tightly adhered to each other to efficiently collect the electric current generated by the electrode assembly 25.

Accordingly, the regions of the positive and the negative electrode non-active material portions 22b and 23b except for both ends thereof are pressurized and flattened, which are referred to hereinafter as the flat portions 22bb and 23bb.

Figure 2A:
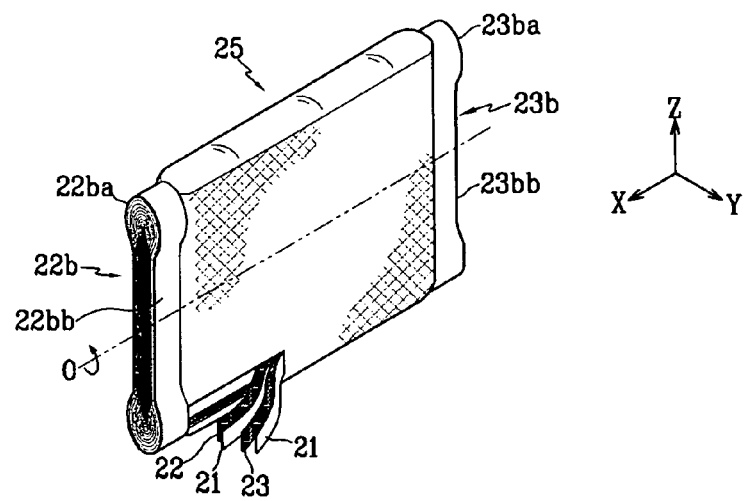
FIGS. 2A, 2B and 2C are perspective views of an electrode assembly of the secondary battery according to the first embodiment of the present invention.

With the formation of the flat portions 22bb and 23bb, both ends 22ba and 23ba of the positive and the negative electrode non-active material portions 22b and 23b are bent so that they have a relatively large thickness, as compared to the flat portions 22bb and 23bb, as shown in FIG. 2A.

However, when the positive and the negative electrode non-active material portions 22b and 23b are partially differentiated in thickness, the lead elements 65 and 65' contacting them are not completely adhered to the positive and the negative electrode non-active material portions 22b and 23b, and loosened at the borderline area between both ends thereof 22ba and 23ba and the flat portions 22bb and 23bb while forming a gap.

In this case, the contact resistance of the lead elements 65 and 65' with respect to the positive and the negative electrode non-active material portions 22b and 23b is increased, and accordingly, the current collecting efficiency is deteriorated due to the lead elements 65 and 65'.

Figure 2B:
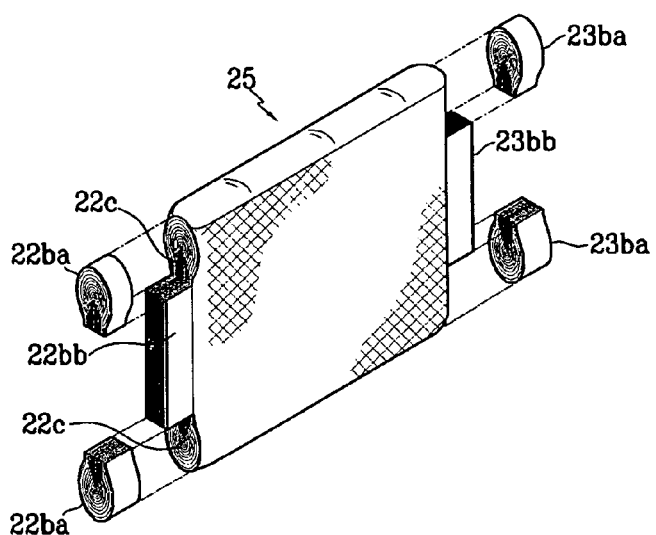

In order to prevent such a problem, with the electrode assembly 25 according to the present embodiment, the bent ends 22ba and 23ba thereof are cut from the positive and the negative electrode non-active material portions 22b and 23b such that cut portions 22c and 23c are formed at the positive and the negative electrode non-active material portions 22b and 23b, as shown in FIG. 2B.

Two cut portions 22c and 23c are formed at the positive and the negative electrode non-active material portions 22b and 23b. However, the cut portions formed at the positive and the negative electrode non-active material portions 22b and 23b are not limited thereto.

For example, with the above-structured positive and negative electrode non-active material portions 22b and 23b, only those of the ends 22ba and 23ba sided with the lead elements 65 and 65' can be cut to form the cut portions.

That is, at least one cut portion can be formed at the positive and the negative electrode non-active material portions 22b and 23b.

Figure 2C:
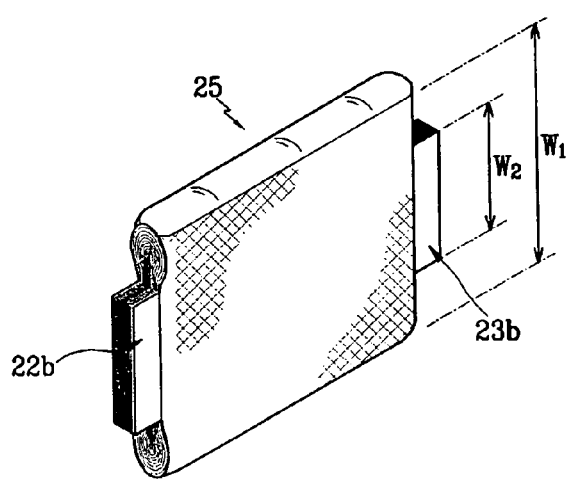

With the cut portions 22c and 23c, the positive and the negative electrode non-active material portions 22b and 23b have a width W2 smaller than the width W1 of the electrode assembly 25, as shown in FIG. 2C.

The positive and the negative electrode non-active material portions 22b and 23b are formed with separate and flat positive and negative electrode current collectors, which are respectively multiply-laminated with each other.

The connection relationship between the electrode assembly 25 and the positive and negative electrode terminals 61 and 61' is explained as follows.

Figure 3:
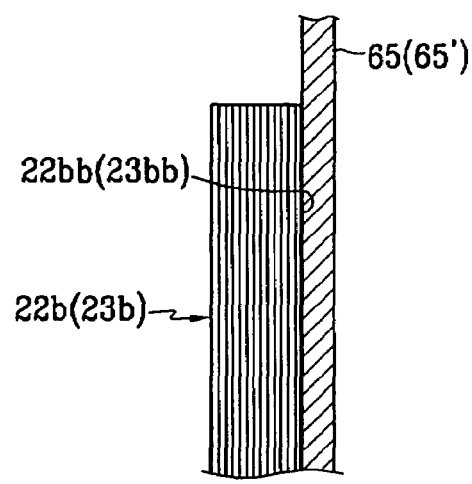
FIG. 3 is a cross-sectional view of the electrode assembly and a lead element of the secondary battery according to the first embodiment of the present invention.

As shown in FIG. 3, the lead elements 65 and 65' are tightly adhered to the one-sided ends of the positive and negative electrode non-active material portions 22b and 23b, and welded thereto such that they are electrically connected to the latter.

Since the positive and the negative electrode non-active material portions 22b and 23b are kept flat without any bent portions, the lead elements 65 and 65' well contact the positive and the negative electrode non-active material portions 22b and 23b without any gaps.

Accordingly, the contact area of the lead elements 65 and 65' with respect to the positive and the negative electrode non-active material portions 22b and 23b can be enlarged, and the contact resistance can be decreased.

Figure 4:
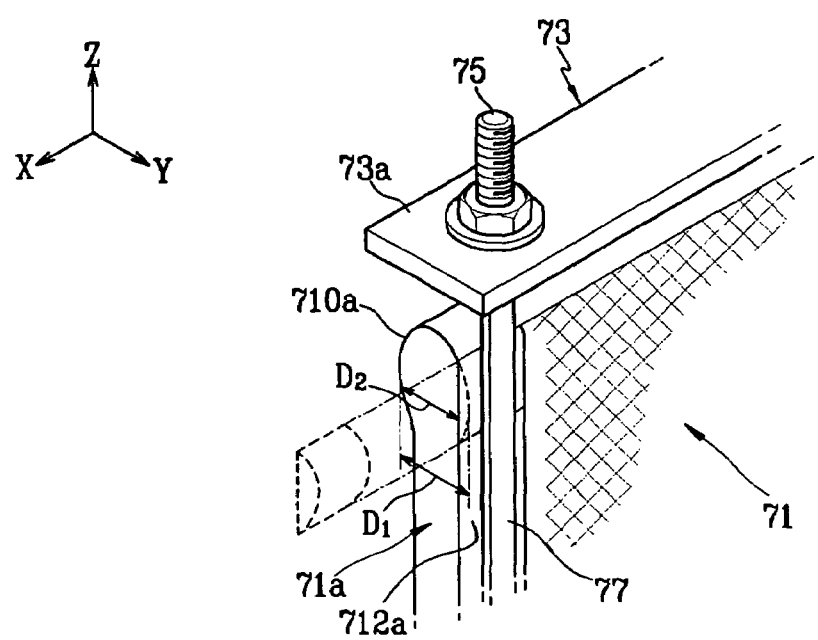
FIG. 4 is a partial perspective view of a secondary battery according to a second embodiment of the present invention.
Figure 5:
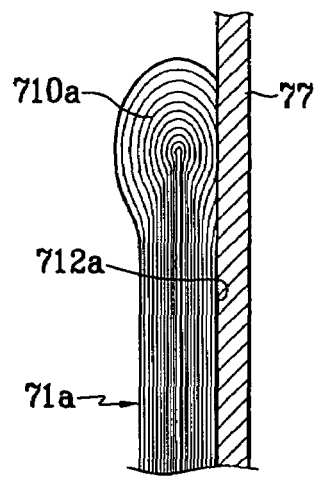
FIG. 5 is a cross-sectional view of an electrode assembly and a lead element of the secondary battery according to the second embodiment of the present invention.

FIGS. 4 and 5 illustrate a secondary battery according to a second embodiment of the present invention.

As shown in the drawings, an electrode assembly 71 and a cap assembly 73 are formed in the same way as with the previous embodiment, and hence, a specific explanation thereof has been omitted.

With the second embodiment, a lead element 77 electrically connects a positive electrode terminal 75 provided on a cap plate 73a of the cap assembly 73 to a positive electrode non-active material portion 71a of the electrode assembly 71. In order to tightly adhere the lead element 77 to the positive electrode non-active material portion 71a without any gaps, the bent end 710a of the positive electrode non-active material portion 71a is not completely cut as with the previous embodiment, but rather is partially cut.

The bent end 710a of the positive electrode non-active material portion 71a is cut large enough to make the flat portion 712a and surface thereof substantially flat.

For explanatory convenience, FIGS. 4 and 5 illustrate only the positive electrode non-active material portions 71a of the electrode assembly 71, the positive electrode terminal 75, and the positive electrode lead element 77. The structure of the positive electrode non-active material portion and the lead element connected thereto can be applied to the negative electrode non-active material portion of the electrode assembly 71 and the negative electrode lead element connected thereto.

Furthermore, with the second embodiment, one or more parts of the bent end 710a of the positive electrode non-active material portion 71a can be cut. This structure can be similarly applied to the negative electrode non-active material portion.

With such a structure, the thickness D1 of the electrode assembly 71 according to the second embodiment is greater than the thickness D2 of the positive electrode non-active material portion 71a or the negative electrode non-active material portion.

Figure 6:
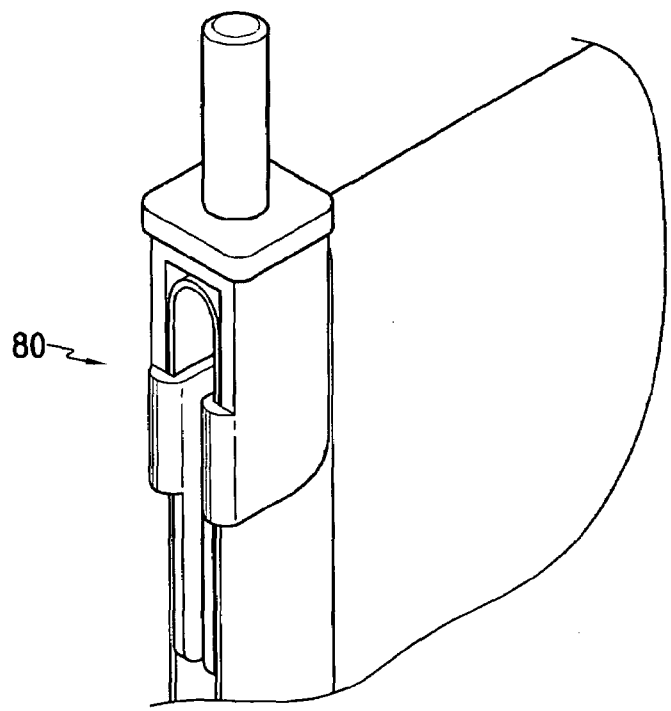
FIG. 6 is a partial perspective view of a variant of a lead element according to the present invention.

FIG. 6 illustrates a variant of a secondary battery according to the present invention. In this variant, a lead element 80 with a structure different from those related to the first and the second embodiments is applied to the electrode assembly, thereby forming a secondary battery.

As shown in the drawing, the lead element 80 is connected to an external terminal while diverging into two portions, which are fitted to the non-active material portion of the electrode assembly while contacting it.

A plurality of the above-structured secondary batteries are connected to each other serially or in parallel to construct a secondary battery module, and used as the power supply for driving motors in Hybrid Electric Vehicles HEVs, Electric Vehicles EVs, cordless vacuum cleaners, electric bicycles, electric scooters and the like.

Figure 7:
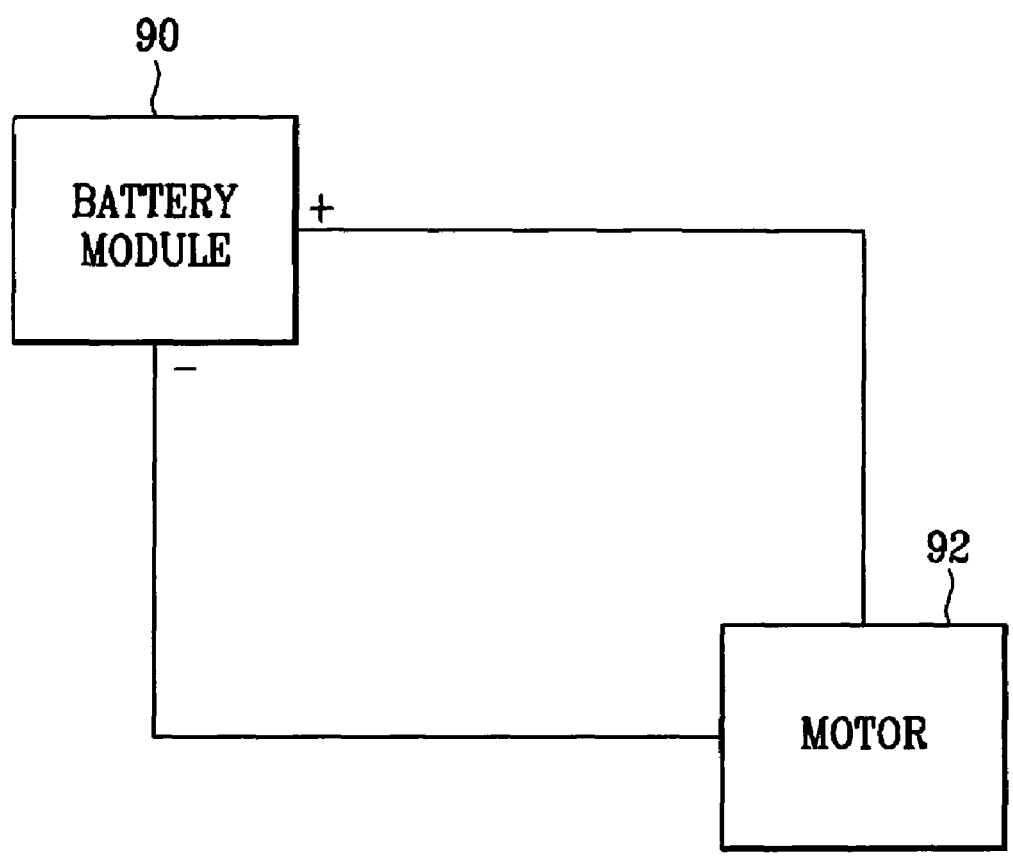
FIG. 7 is a block diagram of the driving of a motor with a secondary battery module based on secondary batteries according to an embodiment of the present invention.

FIG. 7 is a block diagram of the driving of a motor 92 with a secondary battery module 90 based on secondary batteries according to an embodiment of the present invention.

With the structure according to the present invention, the contact resistance due to the lead elements for electrically connecting the electrode terminals to the electrode assembly is minimized to thereby enhance the current collecting efficiency.

Consequently, the energy density of the secondary battery is heightened to thereby improve the operation characteristic thereof.

Although exemplary embodiments of the present invention have been described in detail hereinabove, it should be clearly understood that many variations and/or modifications of the basic inventive concept herein taught which appear to those skilled in the art still fall within the spirit and scope of the present invention, as defined by the appended claims.

What is claimed is:

1. A secondary battery, comprising:
an electrode assembly including a positive electrode, a negative electrode, and a separator spirally wound in a flattened non-circular spiral, the positive and the negative electrodes each having a plurality of non-active material portions containing no active material extending from the spirally wound positive and negative electrodes and separator, each plurality of non-active material portions being arranged as a laminate;
a case adapted to contain the electrode assembly therein; and
a cap assembly attached to the case and including a positive electrode terminal and a negative electrode terminal, the positive and negative electrode terminals being respectively electrically connected to the plurality of laminated non-active material portions of the positive and negative electrodes;
wherein a width of the electrode assembly $W_1$ is greater than a width of the plurality of laminated non-active material portions $W_2$ of the positive and negative electrodes.

2. The secondary battery of claim 1, wherein the plurality of non-active material portions of the positive and negative electrodes each comprise at least one tab portion.

3. The secondary battery of claim 2, wherein the plurality of non-active material portions of the positive and negative electrodes each comprise a hexahedron shape.

4. The secondary battery of claim 3, wherein the plurality of laminated positive and negative non-active material portions respectively comprise laminated separate and flat positive and negative current collectors.

5. The secondary battery of claim 1, wherein the positive and negative electrode terminals are respectively electrically connected to the laminated non-active material portions of the positive and negative electrodes via lead elements.

6. The secondary battery of claim 1, wherein the cap assembly comprises a cap plate having coupling holes adapted to receive the positive and negative electrode terminals, and wherein the cap plate is coupled to the case and adapted to cover an opening of the case.

7. The secondary battery of claim 1, comprising a prismatic shape.

8. A secondary battery, comprising:
an electrode assembly including a positive electrode, a negative electrode, and a separator spirally wound in a flattened non-circular spiral, the positive and the negative electrodes each having a plurality of non-active material portions containing no active material extending from the spirally wound positive and negative electrodes and separator, each plurality of non-active material portions being arranged as a laminate;
a case adapted to contain the electrode assembly therein; and
a cap assembly attached to the case and including a positive electrode terminal and a negative electrode terminal, the positive and negative electrode terminals being respectively electrically connected to the plurality of laminated non-active material portions of the positive and negative electrodes;
wherein a thickness of the electrode assembly $D_1$ is greater than a thickness of the plurality of laminated non-active material portions $D_2$ the positive and negative electrodes.

9. The secondary battery of claim 8, wherein the plurality of non-active material portions of the positive and negative electrodes each comprise at least one tab portion.

10. The secondary battery of claim 9, wherein the positive and negative electrode terminals are respectively electrically connected to the plurality of non-active material portions of the positive and negative electrodes via lead elements, and wherein the tab portions are arranged at contact areas of the plurality of non-active material portions of the positive and negative electrode non-active material portions contacting the lead elements.

11. The secondary battery of claim 8, wherein the cap assembly comprises a cap plate having coupling holes adapted to receive the positive and negative electrode terminals, and wherein the cap plate is coupled to the case and adapted to cover an opening of the case.

12. The secondary battery of claim 8, comprising a prismatic shape.

* * * * *